July 1, 1969

D. L. RICHARDSON 3,452,708

LEAK INDICATING DUST CAP FOR PNEUMATIC TIRES

Filed July 28, 1967

INVENTOR.
DAVID L. RICHARDSON
BY

United States Patent Office 3,452,708
Patented July 1, 1969

3,452,708
LEAK INDICATING DUST CAP FOR PNEUMATIC TIRES
David L. Richardson, 414 N. Race St., Glasgow, Ky. 42141
Filed July 28, 1967, Ser. No. 656,930
Int. Cl. B60c 23/02
U.S. Cl. 116—34       1 Claim

ABSTRACT OF THE DISCLOSURE

Dust cap for pneumatic tires having a body portion which threads onto the valve stem, and which body portion comprises a transparent dome at the outer end, within which dome is an expansible element the interior of which is in fluid communication with the inlet end of the valve stem when the dust cap is mounted on the valve stem so that leakage of the valve in the valve stem will result in expansion of the flexible element and which expansion will be readily visible through the transparent dome whereby a condition of valve leakage can readily be observed.

---

The present invention relates to dust caps for pneumatic tires and is particularly concerned with a dust cap of this nature which will provide a readily discernible, visual indication of a condition of leakage of the filling valve in the valve stem.

Pneumatic tires have stems projecting therefrom which are internally threaded for receiving a standard valve and which are externally threaded for receiving a dust cap. Normally the dust caps include sealing gaskets so that when the dust cap is screwed down tightly on the valve stem, it will tend to prevent leakage therefrom even if the valve within the stem is leaking slightly. Leaking valves in valve stems of this nature are because of tire damage and inconvenience because the valves leak slowly and erratically, and it is sometimes difficult to detect a leaking valve without going to considerable trouble.

The present invention proposes the provision of a dust cap for the valve stem of a pneumatic tire which will provide a ready indication of leakage of the valve within the valve stem so that the leaking of the valve can be detected. Furthermore, the present invention proposes the provision of a leak indicating dust cap for a valve stem in which the leakage of the valve in the stem is detectable even when the leakage is erratic. For example, a valve may leak only when the tire is warm or under certain other conditions, and leakage of this nature is difficult to detect when the tire is cool and placed under test. The indicating dust cap according to the present invention will detect and indicate leakage of the valve stem when it occurs and will retain the indication even after a valve ceases to leak.

It is a further object of the present invention to provide a leak indicating dust cap for a pneumatic tire valve stem which is relatively inexpensive to manufacture.

It is also an object of the present invention to provide a dust cap of the nature referred to which is not easily broken, and which does not require a special valve stem but can be mounted on any conventional pneumatic tire valve stem.

The foregoing objects as well as still other objects and advantages of the present invention will become more apparent upon reference to the following detailed specification taken in connection with the accompanying drawings, in which.

Figure 1:
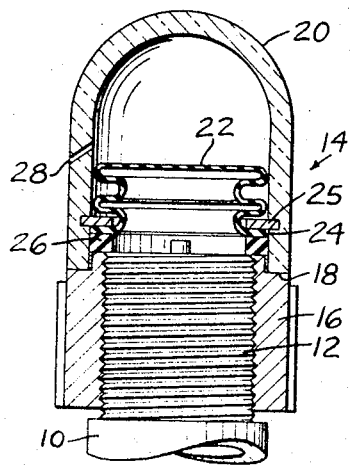
FIGURE 1 shows an indicating dust cap according to the present invention in section and mounted on a pneumatic tire valve stem.

Referring to the drawings somewhat more in detail, in FIGURE 1, 10 indicates a conventional pneumatic tire valve stem having a valve therein and threaded at 12 for receiving a dust cap which is generally indicated at 14. The dust cap in FIGURE 1 comprises a lower portion 16 which threads on threads 12 of the valve stem. Lower portion 16 is provided with a shoulder or tenon at 18 and cemented thereto is a transparent dome-like member 20. Within dome-like member 20 is a relatively thin, balloom-like element 22 which is normally in collapsed condition inside dome-like member 20 and thus having a distinctive appearance within dome-like member 20.

Balloon-like element 22 has a rim part 24 which is engaged on the back by snap ring 25 disposed in an internal groove in dome-like member 20. On its lower side, rim part 24 is engaged by rubber-like sealing washer 26 which also engages the upper end of lower portion 16 of the dust cap so as to be held in place therein. Washer 26 sealingly engages the upper end of valve stem 10 when the dust cap is threaded in place on the valve stem.

If the valve in the valve stem does not leak, balloon-like element 22 remains in its collapsed position, or at least is not tightly pressed against the inner surface of dome-like member 20. However, should the valve in stem 10 leak even a small amount, balloon-like element 22 will be expanded into tight engagement with the inner surface of dome-like member 20 and thus will be readily visible from externally of the dome-like member 20.

A bleed hole 28 may be provided in dome-like member 20 to permit complete expulsion of the air therefrom when balloon-like element 22 expands, but even without bleed hole 28, the characteristic appearance of balloon-like element 22, as viewed through dome-like member 20, will change radically from its uninflated condition to its inflated condition. A ready indication of a condition of leakage of the valve in the valve stem is thus provided which can be observed at a glance.

Even if the valve leaks only a slight amount, for example only when the tire is heated, he balloon-like element 22 will retain therein the air which leaks from the valve so that this erratic or intermittent leakage will be indicated as well as steady leakage from the valve.

The forces developed within the valve cap, even when the valve leaks freely, will not be sufficient to break the cap in any way. For example, if the dome-like member 20 is about ⅜ inch in diameter, and a tire is inflated to about 30 pounds, there will only be an axial force of about 3 pounds developed within the dome-like member when the valve leaks freely.

It will be appreciated that the parts of the dust cap can readily be formed by conventional manufacturing processes so that the dust cap as illustrated is quite inexpensive to manufacture and assemble and can thus be sold at low cost to form the original equipment for pneumatic tires, or for purchase by tire owners as a replacement item.

Figure 2:
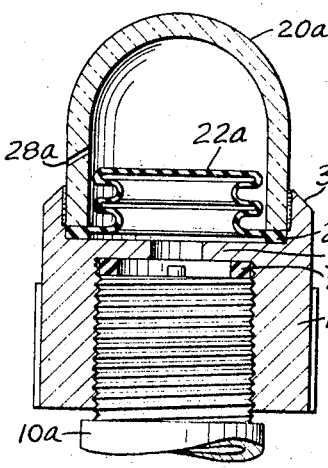
FIGURE 2 is a sectional view showing a modified construction of the valve stem.

The modification of FIGURE 2 shows how lower part 16a of the dust cap could be formed, as by folding of a plastic material, to have an internal rib 30. The seal washer 26a engages the underside of rib 30, whereas the rim part 24a of the expansible element 22a engages the upper side of rib 30. The transparent dome-like member 20a telescopically engages the portion 32 extending upwardly from rib 30 and is cemented thereto. The operation of the modification of FIGURE 2 is exactly the same as that described in connection with the modification of FIGURE 1.

Figure 3:
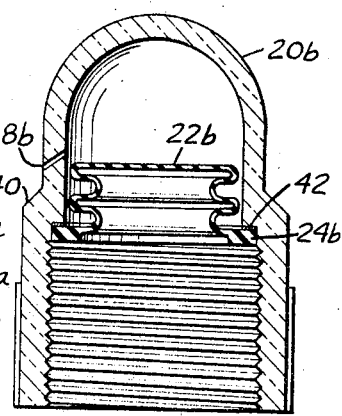
FIGURE 3 is a another sectional view showing a still further modification.

FIGURE 3 shows a still further modification where the entire dust cap 40 is a single folding. In this case the expansible element 22b is formed with a thickened rim part 24b which bears against shoulder 42 inside the cap at the base of the transparent dome portion 20b thereof, and thereby also forms the portion of the cap which sealingly engages the outer end of the valve stem. Rim portion 24b can be cemented in place within cap 40 if so desired, although this would not usually be necessary.

Figure 4:
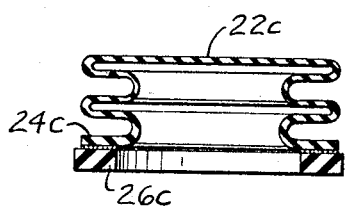
FIGURE 4 is a sectional view showing how the indicator element of the valve stem can be combined with a conventional seal washer.

In FIGURE 4 there is shown a modification which could be employed with the arrangement of FIGURE 1, or with the arrangement of FIGURE 3. In FIGURE 4 the expansible element 22c has a rim portion 24c which is cemented to the upper surface of sealing washer 26c to form a sub-unit which can be mounted in place in substantially any type of dust cap having a transparent dome portion.

All of the modifications illustrated are inexpensive and all are operable for indicating leakage of the valve in the valve stem on which the caps are mounted, whether this leakage is steady or whether it is intermittent, and whether or not the leakage is of a large amount or of a small amount.

The transparent dome portions within which the expansible balloon-like element is mounted have been shown as having smooth interior surfaces, but it will be understood that the internal surface of the transparent dome member could be fluted or bear some other holdable configuration such that the dome member was more or less mirror-like prior to inflation of the expansible element therein, but became transparent upon inflation of the rubber-like element. Such an arrangement would sharpen the contrast between the appearance of the dust cap when the expansible element was collapsed and the appearance of the dust cap when the expansible element was expanded therein. The present invention contemplates a completely transparent dome portion and also contemplates a dome portion which becomes transparent when the rubber-like expansible element therein is pressed against the inside surface of the transparent dome-like element.

Figure 5:
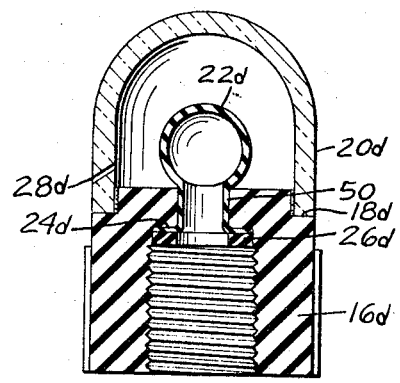
FIGURE 5 is a section through still another modification.

FIGURE 5 shows a particularly simple way in which the leak indicating dust cap according to the present invention can be made. The dust cap in FIGURE 5 comprises the body portion 16d provided with internal threads so that it can be threaded on the outer end of a valve stem. Body portion 16d is provided with a shoulder or tenon 18d at its outer end and mounted thereon and cemented thereto is the transparent dome portion 20d which may, as mentioned before, be provided with an exhaust hole 28d.

The outer end of body portion 16d is provided with an aperture 50 which forms a downwardly facing shoulder. The flexible expansible element 22d has a rim part 24d which engages the shoulder about aperture 50 and there may also be provided, if desired, the additional sealing washer 26d.

The flexible expansible element is merely pushed through aperture 50 so that the rim part rests on the shoulder about aperture 50, and this completes the assembly of the flexible element with the dust cap. The addition of the sealing washer 26d is generally advisable because this is made of a tough, rubber-like material which is somewhat different in nature than the freely expansible material on which the flexible element 22d is made.

The combined flexible element and sealing washer structure shown in FIGURE 4 could be used to advantage in connection with the FIGURE 5 modification.

It will be understood that this invention is susceptible to modification in order to adapt it to different usages and conditions and, accordingly, it is desired to comprehend such modifications within this invention as may fall within the scope of the appended claim.

I claim:

1. A dust cap for the valve stem of a pneumatic tire comprising: a body portion having internal threads for receiving the valve stem, a dome portion mounted on the outer end of the body, said dome portion being formed entirely of transparent material, and a flexible expansible bellows-like element of a color contrasting to that of said dome portion inside said dome portion and sealed to said dome portion adjacent that region of said body portion which is disposed at the outer end of the valve stem when the cap is mounted on the valve stem, said element normally being collapsed inside said dome portion but expanding inside the dome portion so as to fill the dome portion if the valve in said valve stem leaks, whereby leakage of the said valve can be discerned by observation of the said dome portion, said dome portion being formed with a bleed hole, said transparent dome portion and said body portion being in telescopic engagement, and the dome portion being cemented to the outer end of said body portion, said dome portion having an internal annular groove therein adjacent the body portion thereof and a snap ring in said groove forming an internal shoulder, said flexible element having a thickened annular rim part engaging said internal shoulder which faces said body portion, and a resilient sealing washer disposed between the outer end of said body portion and said rim part on the side thereof opposite said shoulder and holding the said rim part against said shoulder.

References Cited

UNITED STATES PATENTS

| | | | |
|---|---|---|---|
| 1,388,443 | 8/1921 | Stewart et al. | 116—34 |
| 1,472,712 | 10/1923 | Altz et al. | 116—34 |
| 1,496,998 | 6/1924 | Pulverman | 138—89.4 |
| 1,834,079 | 12/1931 | Stivender | 116—34 |
| 2,417,449 | 3/1947 | Rubin | 116—34 |
| 2,579,120 | 12/1951 | Mercer | 116—34 |
| 2,618,977 | 11/1952 | Hottenroth | 116—34 |
| 2,689,481 | 9/1954 | Quiat | 116—34 |
| 2,795,204 | 6/1957 | Rose | 116—34 |
| 3,111,930 | 11/1963 | Zipper | 116—34 |
| 3,241,514 | 3/1966 | Grimland | 116—34 |
| 3,380,427 | 4/1968 | Rubin | 116—34 |

LOUIS J. CAPOZI, Primary Examiner.

U.S. Cl. X.R.

73—146.8